July 7, 1964 A. C. NEWMAN 3,139,693
FISH LURE
Filed Sept. 5, 1961

*INVENTOR.*
ALBERT C. NEWMAN
BY FULWIDER, MATTINGLY
& HUNTLEY

ATTORNEY

United States Patent Office 3,139,693
Patented July 7, 1964

3,139,693
FISH LURE
Albert C. Newman, 272½ Euclid, Long Beach, Calif.
Filed Sept. 5, 1961, Ser. No. 136,022
5 Claims. (Cl. 43—42.39)

This invention relates generally to fish lures but more particularly to lures which can be controlled as to their direction of movement through the water.

Fishing is today a very popular sport or hobby in that it is practiced by a great many adults and youngsters. One of the more favorite styles of fishing is bait casting wherein an artificial lure is cast by the fisherman from the shore of a lake or other body of water or from a boat thereon to the location of the sought-after fish. As is common practice, the artificial lure is attached to the end of a fish line so that it can be retrieved merely by reeling in the line. During such retrieval operation, the lure is intended to attract the fish as it passes in their vicinity.

However, lures generally available today are retrieved along a substantially straight line from the point to which the lure is cast to the position of the fisherman, the attraction qualiites of the lure being built around its appearance or motion such as wiggling or the like. Since such lures are retrieved along a straight line, the area covered thereby or the area exposed to the attraction qualities of the lure is substantially restricted. Accordingly, it is an object of this invention to provide a fish lure which is so constructed as to cover a relatively large area during retrieval operation.

Another object of the present invention is to provide a fish lure which can be caused to move in various different directions during retrieval operation.

Another object is to provide a fish lure which is so constructed as to be controllable as to the direction of movement thereof.

Another object of the present invention is to provide a fish lure as characterized above which can be caused to substantially reverse its direction of movement whenever desired during retrieving operation.

Another object of this invention is to provide a fish lure as characterized above which can be made to follow a zigzag path while being retrieved.

Another object of this invention is to provide a fish lure which is simple and easy to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

Like reference numerals indicate corresponding parts throughout the several views of the drawing.

Figure 1:
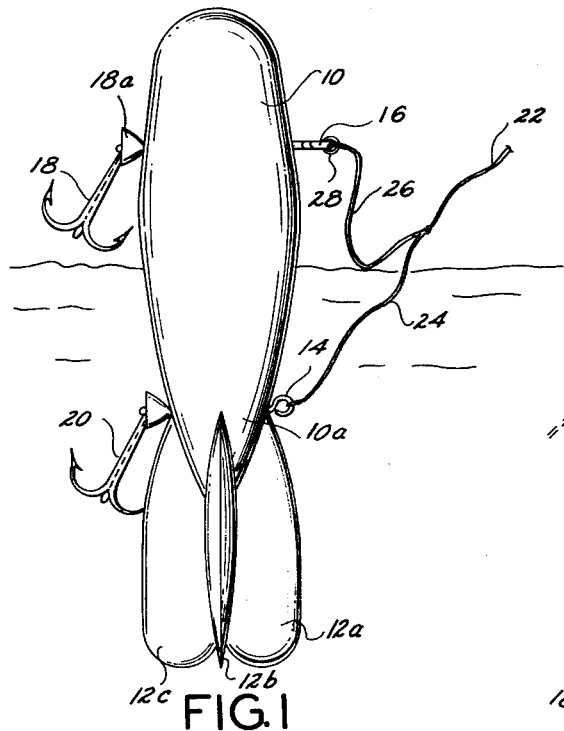
FIGURE 1 is a side elevational view of a fish lure according to the present invention.

Referring to the drawings, the embodiment chosen for illustration of the present invention comprises a body 10 which may be formed of wood or plastic materials as desired. For optimum operation of the lure shown in the drawings, it is necessary for body 10 to be buoyant in water as would result from its being made of material of less density than water or from its being formed with a hollow interior. As will be readily apparent to those persons skilled in the art, body 10, and certain of the other parts of the lure may be painted or provided with any preferred markings or accessory items for enhancing the attractive qualities of the resulting lure. Although body 10 may be formed in any desired shape, it has been found most desirable to have it simulate the body of a fish.

Body 10 is provided with a tapered rearward end portion 10a to which is fastened a plurality of rearwardly extending diametrically oppositely disposed fin members 12a, 12b, 12c and 12d. Such fins may be formed of any desirable material such as sheet steel, plastic or the like, it merely being desirable for optimum operation of the present invention that a pair of such fins be arranged on opposite sides of the longitudinal center line of body 10. That is, for purposes to be hereinafter explained in detail, it is most desirable to have the fins aligned in pairs to present a solid or continuous coplanar surface.

An ordinary eye screw or eye bolt 14 is threadedly mounted in end portion 10a of body 10 immediately adjacent the fin structure to provide line attachment means for fastening a fish line to the lure as will hereinafter be described.

Figure 2:
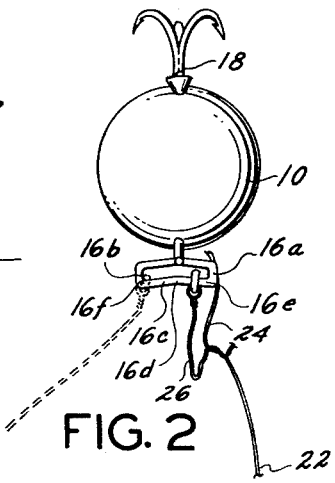
FIGURE 2 is a top view of the lure shown in FIGURE 1.

Near the upper or forward end portion of body 10 is a line attachment or fastening hook 16 of particularly novel construction. As shown most clearly in FIGURE 2 of the drawings, hook 16 is formed of wire or other suitable material which is provided with a closed loop having a substantially rectangular shape due to end portions 16a and 16b and side portion 16c. The side portion 16c is formed with a slight inward bend as at 16d to afford corners 16e and 16f of fastening hook 16 which are offset with respect to bend 16d.

Figure 3:
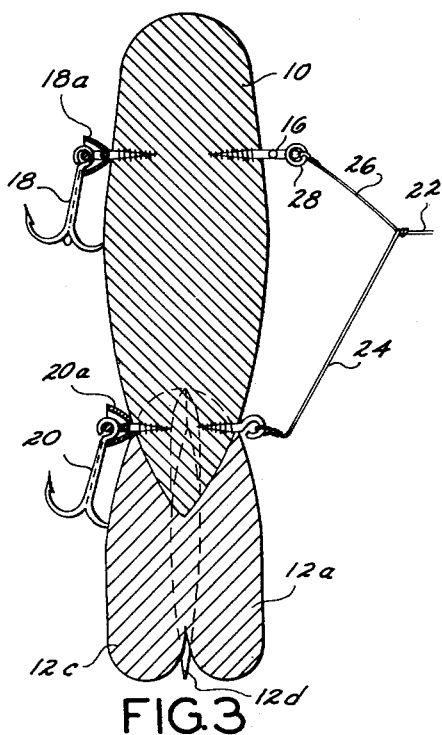
FIGURE 3 is a sectional view taken substantially along the longitudinal center line of the fish lure of FIGURE 1.

Fastening hook 16 may be provided with any desired fastening means such as fastening threads for suitably anchoring hook 16 in body 10 as shown most clearly in FIGURE 3 of the drawings.

Fastened to the side of body 10 are a pair of fish hooks 18 and 20 which may be of substantially any preferred design, the fish hooks shown in the drawing being treble hooks which present hooking means in three different directions. Fish hooks 18 and 20 may be fastened to body 10 by any suitable means such as fastening threads as shown most clearly in FIGURE 3. Such hooks are shown on the drawings as including movement limiting means 18a and 20a, respectively, which are cup-shaped members fastened to the threaded portion of such hooks for limiting the pivotal movement thereof. This arrangement prevents fouling of the hooks with the fins of the lure and also with the other parts of the device.

A fish line is shown generally at 22 and is attached to the fish lure by a Y-shaped bridle or rigging consisting of a line 24 which extends from the end of fish line 22 to eye screw 14 and a line 26 which extends from the end of fish line 22 to a ring 28 on fastening hook 16. It is necessary for successful operation of the present invention that the ring or annular member 28 be of such size with respect to the wire of which fastening hook 16 is constructed, that member 28 fits relatively loosely thereon. That is, ring 28 must be movable from one to the other of the corners 16e and 16f of the elongated annulus of hook 16 without requiring a considerable force. With fish line 22 appropriately fastened to a fishing pole or rod and retriving means such as reel (neither of which is shown in the drawings), it is a simple matter to cast the lure into the water in the usual manner.

When the lure reaches the proper position in the water to which it has been cast, the direction of return movement thereof can be controlled. Firstly, it is necessary to allow the lure to come to rest for a few seconds. This is commensurate with good fishing practice in that it is most often desirable to allow the lure to remain idle for a short period of time after it has been cast, to allow the commotion and general disturbance caused by the lure hitting the water to subside.

By allowing the lure to come to rest, it will assume the position shown generally in FIGURE 1 of the drawings. That is, since the fins 12a, 12b, 12c and 12d are the heaviest portion of the lure the end portion 10a of body 10 will be positioned downwardly. However, since the body 10 of the lure is buoyant a portion of the lure will remain exposed about the surface of the water. It is most desirable for successful practice of this invention that fastening hook 16 remains above the water level while the lure is in this "at rest" position.

While the line is so positioned the fisherman can position the ring 28 in either of the corners 16e and 16f of hook 16 merely by whipping or pulling the fish line 22 to one side or the other. That is, referring to FIGURE 2 of the drawings, by moving the fish line 22 leftward it is possible to cause ring 28 to be moved into corner 16f as shown in dotted lines. As will hereinafter become more evident, if the fishermen should desire the lure to move to his left it is merely necessary for him to cause ring 28 to be positioned in corner 16f. Conversely, if he should desire the lure to move to the right upon commencement of the retrieval action, it is merely necessary for him to position the ring 28 in the corner 16e.

Once the foregoing has been accomplished, the fishermen can commence the retrieval action. When this happens, the force transmitted to the lure though fish line 22 and rigging line 26 will cause the lure to tip to one side or the other depending upon the offset position of line 26. That is, with line 26 and ring 28 in the dotted line position of FIGURE 2, as the retrieval action is commenced the force thereof will cause the lure to tip to the left. Once this happens, the lure will tend to be moved broadside through the water due to the Y-shaped double rigging produced by lines 24 and 26.

As the lure tries to go through the water broadside, the diametrically oppositely disposed fins, here fins 12b and 12d, will tend to prevent such movement, and due to the angular disposition of such fins on body 10 the lure will be forced to move in a lateral or sidewise direction with respect to the retrieval direction. That is, due to the action of fins 12b and 12d against the water, the retrieval force will be converted into several component forces one of which will be in a direction lateral to the direction of retrieval.

Figure 4:
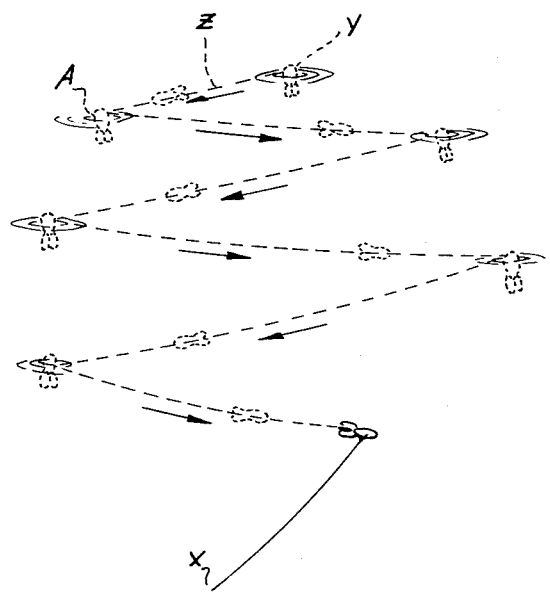
FIGURE 4 is a diagram of a path which can be followed by the lure of FIGURE 1 during retrieval operation.

Thus, referring to FIGURE 4 of the drawings, after the lure has been cast from a point X to a point Y it can be retrieved along line Z by virtue of the ring 28 having been positioned in corner 16f of fastening hook 16. When it is desired to change the direction of movement of the lure, it is merely necessary to permit the lure to come to rest as at point A and to then change the position of ring 28 to corner 16e of fastening hook 16. In this manner, the fish lure can be caused to traverse back and forth as it is brought back to the fishermen thereby covering a considerable area of the surface of the water.

It is contemplated within the scope of this invention that a fish lure incorporating these teachings may be a surface lure or a subsurface lure as desired.

It will be noted that the present invention affords a very maneuverable fish lure having many advantages. For instance, with a lure constructed in accordance with this invention it is possible to cast it over an obstacle, as for instance a weed bed or exposed log, and thereafter to cause it to be retrieved around the side of such obstacle. Also, it is possible to direct such a lure to a particular location where it is believed the fish are located. That is, since it is well known that fish frequently feed near weed beds and shore lines, it is possible to "work" or move the lure to these particular locations without the risk of snagging the lure on logs, weeds or the like.

It is thus seen that the present invention provides a fish lure which can be readily controlled as to its direction of movement through the water.

Although I have shown and described certain specific embodiments of my invention, I am fully aware that many modifications thereof are possible. The invention itself therefore is not to be restricted except insofar as is necessitated by the prior art and by the spirit of the appended claims.

I claim:
1. A fish lure comprising:
an elongated, buoyant body having a weight distribution causing said body to normally float in water with its longitudinal axis in a substantially vertical position;
said buoyant body having an elongated body member with a forward end portion and a rearward end portion;
a pair of line attachment devices on said body member adjacent said forward and rearward end portions, respectively;
guide fins on said body member which are positioned adjacent said rearward end portion and which resist lateral movement of the buoyant body through the water;
and a bridle element attached to and extending between said devices and adapted for attachment to a retrieving line at a point on said bridle element located between said devices said bridle element transmitting a force to said body member to keep said longitudinal axis in a plane substantially perpendicular to said retrieving line whereby a pull on said line tends initially to move said vertically disposed body member broadside through the water along the axis of said line and thence upwardly out of the water to a point of instability effecting lateral tipping of said body member away from said axis of said line, continued pulling on said line tending to urge said body member along a path substantially coincident with the longitudinal axis of said body member and laterally away from said axis of said line.
2. A fish lure as set forth in claim 1, wherein,
two guide fins are disposed on opposite sides of said body member and face said retrieving line;
and a substantial portion of said body member is tapered inwardly.
3. A fish lure as set forth in claim 1 wherein,
said bridle element is a line which is of greater length than the distance between said attachment devices;
and said retrieving line is connected to said bridle element at a point which is closer to the line attachment device adjacent said forward end portion.
4. A fish lure as set forth in claim 3, wherein
two guide fins are disposed on opposite sides of said body member and face said retrieving line;
and, a substantial portion of said body is tapered inwardly.
5. A fish lure comprising:
an elongated, buoyant body having a weight distribution causing said body to normally float in water with its longitudinal axis in a substantially vertical position;
said buoyant body having an elongated body member with a forward end portion and a rearward end portion;
fin means carried by said body member adjacent said rearward end portion;
a first line attachment device carried by said body member adjacent said rearward end portion;
a second line attachment device carried by said body member adjacent said forward end portion and de- fining an elongated annulus extending transversely of the longitudinal axis of said body member; and a bridle element attached to and extending between said devices and adapted for attachment to a retrieving line at a point on said bridle element located between said devices, said bridle element being transversely slidable in said elongated annulus, whereby a pull on said line tends initially to move said vertically disposed body member broadside through the water along the axis of said line and thence upwardly out of the water to a point of instability effecting lateral tipping of said body member away from said axis of said line, the position of said bridle element in said annulus influencing the direction of said lateral tipping, and continued pulling on said line tending to urge said body member along a path substantially coincident with the longitudinal axis of said body member and laterally away from said axis of said line.

References Cited in the file of this patent

UNITED STATES PATENTS

| | | |
|---|---|---|
| 780,029 | Flegle | Jan. 17, 1905 |
| 1,898,200 | Medlin | Feb. 21, 1933 |
| 1,996,776 | Strausborger | Apr. 9, 1935 |
| 2,262,974 | Steiner | Nov. 18, 1941 |
| 2,412,399 | Henricks | Dec. 10, 1946 |
| 2,580,104 | King | Dec. 25, 1951 |
| 2,826,851 | Borgogno | Mar. 18, 1958 |

FOREIGN PATENTS

| | | |
|---|---|---|
| 1,217,481 | France | Dec. 7, 1959 |